United States Patent
Brahm et al.

[11] Patent Number: 6,001,931
[45] Date of Patent: *Dec. 14, 1999

[54] BINDER MIXTURES FOR TWO-COMPONENT POLYURETHANE COATING COMPOSITIONS

[75] Inventors: Martin Brahm, Engelskirchen; Dieter Margotte, Krefeld; Christian Wamprecht, Neuss; Wieland Hovestadt; Jürgen Meixner, both of Krefeld, all of Germany

[73] Assignee: Bayer Aktiengesellschaft, Leverkusen, Germany

[*] Notice: This patent issued on a continued prosecution application filed under 37 CFR 1.53(d), and is subject to the twenty year patent term provisions of 35 U.S.C. 154(a)(2).

[21] Appl. No.: 07/927,445

[22] Filed: Aug. 10, 1992

[30] Foreign Application Priority Data

Aug. 20, 1991 [DE] Germany .............................. 41 27 513

[51] Int. Cl.$^6$ .......................... C08G 18/62; C08G 18/65; C08G 18/79; C09D 175/04
[52] U.S. Cl. ............................................ 525/123; 525/125
[58] Field of Search ...................... 525/123, 125

[56] References Cited

U.S. PATENT DOCUMENTS

| | | | |
|---|---|---|---|
| 3,993,849 | 11/1976 | Victorius | 428/463 |
| 3,998,768 | 12/1976 | Pettit, Jr. | 524/38 |
| 4,442,145 | 4/1984 | Probst et al. | 427/385.5 |
| 4,565,730 | 1/1986 | Poth et al. | 428/204 |
| 4,593,762 | 6/1986 | Interthol et al. | 166/275 |
| 4,652,605 | 3/1987 | Chang et al. | 525/10 |

FOREIGN PATENT DOCUMENTS 359532  3/1990  European Pat. Off. .

*Primary Examiner*—D. S. Nakarani
*Attorney, Agent, or Firm*—Joseph C. Gil; Thomas W. Roy

[57] ABSTRACT

The present invention relates to binder mixtures for two-component polyurethane coating compositions which dry at room temperature and contain a) a polyisocyanate component, b) a hydroxy-functional polyacrylate component based on a mixture of at least two hydroxyl group-containing poly(meth)acrylate resins
       i) having a molecular weight ($M_n$) of 1000 to 100,000,
       ii) having an at least bimodal molecular weight distribution,
       iii) prepared by radical copolymerization of olefinically unsaturated monomers in a solvent using monomer mixtures containing less than 50% by weight of monomers carrying hydroxyl groups and
       iv) wherein the hydroxyl group content of the component having the lowest molecular weight is at least 1.5 times the hydroxyl group content of the component having the highest molecular weight, c) optionally reactive diluents, wherein components a) and b) are present in an amount which corresponds to an NCO/OH equivalent ratio of 0.2:1 to 5:1.

12 Claims, No Drawings

BINDER MIXTURES FOR TWO-COMPONENT POLYURETHANE COATING COMPOSITIONS

BACKGROUND OF THE INVENTION

1. Field of the Invention

This invention relates to new binders for two-component polyurethane coating compositions containing a polyisocyanate component and a hydroxy-functional liquid polyacrylate component having an at least bimodal molecular weight distribution.

2. Description of the Prior Art

Two-component polyurethane coating compositions based on hydroxy-functional polyacrylates (the term "polyacrylate" means polymers and copolymers of acrylic or methacrylic acid esters with themselves or with other monomers) and polyisocyanates are known (see e.g. Glasurit-Handbuch Lacke und Farben, 11th Edition, pages 66 et seq, Publishers Curt R. Vincentz Verlag, Hanover, 1984). They are distinguished by outstanding gloss retention, UV resistance and chemical resistance and are superior in these respects to two-component polyurethane coating compositions based on polyesters or coating compositions containing mixtures of polyacrylate copolymers with polyesters as the hydroxyl component. Coatings with good hardness and scratch resistance as well as flexible coatings can be obtained with suitable choice of the comonomers. The polyhydroxy polyacrylates conventionally used are compatible and miscible with the polyisocyanates used as cross-linking agents.

Comparatively high molecular weight polyhydroxy polyacrylates are generally used for the preparation of two-component polyurethane lacquers based on hydroxy-functional polyacrylates which dry quickly at room temperature. Due to their high molecular weight, these polyhydroxy polyacrylates have a high viscosity and therefore are generally used at high dilutions with solvents to ensure that the coating compositions have a sufficiently low working viscosity. Such laquer systems are described, e.g., in EP-A-0 068 383.

Due to ever shorter cycle times, in particular in industrial processes, there is at present a great demand for two-component polyurethane coating compositions which can be dried even more rapidly than the systems of the above-mentioned publication and which for ecological reasons do not require an increase in the proportion of of organic solvents.

It is therefore an object of the present invention to provide new binder mixtures for two-component polyurethane coating compositions based on polyisocyanates and hydroxy-functional polyacrylate resins which dry considerably more rapidly at room temperature but do not have a higher viscosity or higher solvent content.

This object may be achieved by the binder mixtures according to the invention described below. An essential feature of the invention is the observation that binder mixtures based on organic polyisocyanates and hydroxy-functional polyacrylates in which the polyacrylate component has an at least bimodal molecular weight distribution are suitable for solving the stated problem.

SUMMARY OF THE INVENTION

The present invention relates to binder mixtures for two-component polyurethane coating compositions which dry at room temperature and contain a) a polyisocyanate component,
b) a hydroxy-functional polyacrylate component based on a mixture of at least two hydroxyl group-containing poly(meth)acrylate resins
  i) having a molecular weight ($M_n$) of 1000 to 100,000,
  ii) having an at least bimodal molecular weight distribution,
  iii) prepared by radical copolymerization of olefinically unsaturated monomers in a solvent using monomer mixtures containing less than 50% by weight of monomers carrying hydroxyl groups and
  iv) wherein the hydroxyl group content of the component having the lowest molecular weight is at least 1.5 times the hydroxyl group content of the component having the highest molecular weight,
c) optionally reactive diluents, wherein components a) and b) are present in an amount which corresponds to an NCO/OH equivalent ratio of 0.2:1 to 5:1.

DETAILED DESCRIPTION OF THE INVENTION

The preparation of hydroxy-functional polyacrylate resins by a polymerization reaction in the presence of a polymeric diluent is described in U.S. Pat. No. 4,652,605. Hydroxy-functional polyacrylates may also be used as polymeric diluents but such a procedure is not specifically described. Further, the copolymers mentioned in U.S. Pat. No. 4,652,605 have a comparatively low molecular weight ($M_n$) of 400 to 2000 and they are prepared from monomer mixtures containing at least 50% by weight of vinyl monomers containing active hydrogen atoms. The use of organic polyisocyanates as cross-linking agents for the copolymers of the prior publication is also only mentioned incidentally and not specifically described in any of the examples.

Component a) present in the binder mixtures according to the invention contains at least one organic polyisocyanate having an average isocyanate functionality above 2, preferably 2.6 to 6. These polyisocyanates are known and prepared from monomeric diisocyanates having a molecular weight of 168 to 300. The polyisocyanates are modification products of monomeric diisocyanates and contain uretdione, biuret, urethane and/or isocyanurate groups. After the modification reaction, excess quantities of starting diisocyanates are in most cases removed, preferably by thin layer distillation, such that the polyisocyanates contain at most 0.7% by weight, preferably not more than 0.5% by weight of excess starting diisocyanate. The lacquer polyisocyanates present as component a) in the binder mixtures according to the invention generally have an NCO content of 8 to 40% by weight, preferably 10 to 32% by weight.

Examples of diisocyanates suitable for the preparation of the lacquer polyisocyanates include 2,4-diisocyanatotoluene, commercial mixtures thereof with 2,6-diisocyanatotoluene, 4,4'-diisocyanatodiphenylmethane, commercial mixtures thereof with the 2,4'- and optionally 2,2'-isomers and optionally with its higher homologues such as those obtained by the phosgenation of aniline/formaldehyde condensates, 4,4'-diisocyanatodicyclohexylmethane and commercial mixtures thereof with 2,4'-diisocyanato-dicyclohexylmethane, 1,6-diisocyanatohexane (HDI), 1-isocyanato-3,3,5-trimethyl-5-isocyanatomethyl-cyclohexane (IPDI) and mixtures of these diisocyanates.

Preparation of the lacquer polyisocyanates from the starting diisocyanates exemplified above is carried out by known methods. Thus, for example, polyisocyanates containing biuret groups may be prepared by the processes of U.S. Pat. Nos. 3,124,605, 3,358,010, 3,903,126, 3,903,127 or 3,976, 622. Urethane polyisocyanates may be prepared, for example, according to U.S. Pat. No. 3,183,112 and polyisocyanates containing isocyanurate groups are prepared by, for example, the processes according to British Patent Specifications 1,060,430, 1,234,972, 1,506,373 or 1,458,564 or according to U.S. Pat. No. 3,394,111, U.S. Pat. No. 3,645, 979 or U.S. Pat. No. 3,919,218. The preparation of lacquer polyisocyanates containing isocyanurate groups according to the last-mentioned publications is often accompanied by the formation of dimerization products containing uretdione groups, and mixtures of these polyisocyanates with the isocyanurate group-containing polyisocyanates may be used as lacquer polyisocyanates according to the invention.

In the process according to the invention it is preferred to use modified polyisocyanates prepared from aliphatic and/or cycloaliphatic diisocyanates as hardening component a). Especially preferred are biuret group-containing polyisocyanates based on HDI and isocyanurate group-containing polyisocyanates based on HDI and/or IPDI which may optionally contain uretdione groups.

The polyacrylate resins of component b), which is an essential component for the invention, have molecular weights ($M_n$, determined by gel permeation chromatography using polystyrene as standard) of 1000 to 100,000, preferably 1000 to 30,000. An at least bimodal, preferably bimodal, molecular weight distribution is essential. The gel permeation chromatogram has at least two maximums whose molar masses (determined with reference to a scale based on polystyrene standard) preferably differ from one another by a factor of at least 1.3, more preferably at least 1.5. The maximum with the highest molar mass is above 5000, preferably above 9000 and most preferably above 15,000. A maximum may also be represented by a shoulder in the chromatogram. The component with the highest molecular weight has a hydroxyl group content of 0.1 to 4% by weight, preferably from 0.3 to 2% by weight, and the component with the lowest molecular weight has a hydroxyl group content of 0.5 to 8% by weight, preferably 1 to 5% by weight. The hydroxyl group content of the component having the lowest molecular weight is generally at least 1.5 times, preferably at least twice the hydroxyl group content of the component having the highest molecular weight.

Component b) is preferably a mixture of two different polyacrylate resins which have been prepared in two separate operations. The proportion by weight of the resin component having the lower molecular weight is present in an amount of 5 to 95% by weight, preferably 30 to 70% by weight, based on the total weight of component b).

All percentages concerning the composition of component b) is based on the solids content without taking into account any inert solvents present.

Preparation of the polyacrylate component b) which is essential for this invention is preferably carried out by a multistage, preferably a two-stage process in a reaction vessel. Polymerization is carried out in the individual stages by the well-known injection process. When two process stages are employed, the polymers obtained have a bimodal molecular weight distribution. The average molecular weights of the copolymers synthesized in the individual stages can be adjusted by the choice of polymerization temperature, by the initiator/monomer concentration and by substances which serve as radical transferring agents. Preferably only the polymerization temperature and/or the initiator/monomer concentration is varied. It is particularly preferred to vary both parameters at the same time.

In the first stage, a comonomer mixture and an initiator mixture are added to an organic solvent. A comonomer mixture having a low concentration of unsaturated hydroxy-functional monomers is polymerized at a low temperature and/or a low initiator concentration. The hydroxyl group content, based on the solid resin, is 0.1 to 4% by weight, preferably 0.3 to 2% by weight, but the amount of monomers carrying hydroxyl groups used is less than 50% by weight, preferably less than 30% by weight, based on the total quantity of monomers used. The high molecular weight component of the mixture is produced under these conditions.

In the second stage, a second comonomer mixture differing in concentration and/or composition is polymerized in the polymerized polymer/solvent mixture from the first stage to directly incorporate this polymer; the temperature and/or initiator concentration must in this case be higher than in the first stage of the process.

A higher concentration of hydroxy-functional acrylate monomers is used in the second stage. The hydroxyl group content, based on the solid resin, is 0.5 to 8% by weight, preferably 1 to 5% by weight. The low molecular weight component of the mixture is provided in the second stage.

The process stages described above may be carried out in reverse sequence.

After completion of the copolymerization reaction, any traces of readily volatile monomers may be removed by "partial distillation" of the copolymerization mixture.

The polymerization is carried out at a temperature of 40 to 190° C. The properties of the copolymers, in particular the molecular weight, are adjusted by a suitable choice of the reaction temperature and the rate of initiation of the initiator, as previously discussed. The half life of the initiators used should not be less than one second and not above one hour. The type of initiators and the reaction temperature are preferably chosen so that the half life is 1 to 20 minutes. Preparation of the high molecular weight component is preferably carried out at the same temperature or at a lower temperature than that used for the preparation of the low molecular weight component.

The concentration of initiator or initiator mixture may be the same or different in the two stages of the process. For the preparation of the copolymer having a higher average molecular weight it is preferred to use Ness initiator, most preferably less than half the quantity used for the preparation of the copolymer having a lower average molecular weight.

Additional auxiliary agents serving as transferring agents may be used for regulating the molecular weight, for example, mercaptan compositions.

The above-described, preferred method of preparing polyacrylate component b) gives rise to polyacrylate mixtures having an at least bimodal molecular weight distribution, as already mentioned. This is due to the fact that grafting and/or transferring reactions leading to the formation of macromolecules are at most of minor importance. Alternatively, polyacrylate mixtures suitable as component b) according to the invention may also be prepared by mixing separately prepared polyacrylate resins differing in their molecular weight. The above-described preparation of the mixtures by the one-shot process, even though preferred, is not the only embodiment.

Suitable compositions for initiating the radical polymerization include peroxide compositions, e.g., symmetric diacyl peroxides such as acetyl, propionyl, butyryl and lauroyl peroxide; symmetric peroxidicarbonates such as diethyl, diisopropyl, dicyclohexyl and dibenzyl peroxidicarbonate;

dibenzoylperoxide; benzoyl peroxides substituted with bromo-, nitro-, methyl- or methoxy groups; dicumyl peroxide; cumene hydroperoxide; di-tert.-butyl peroxide; tert.-butylperoxy-2-ethyl-hexanoate; tert.-butylperpivalate; tert.-butylperoctoate; tert.-butylphenylperacetate; tert.-butyl-N-(phenylperoxy)-carbonate; tert.-butyl-N-(2,3- or 4-chlorophenylperoxy)-carbonate; tert.-butylhydroperoxide; 2,2-di-tert.-butylperoxybutane; tert.-amylperbenzoate; 1,3-bis-(tert.-butylperoxyisopropyl)-benzene; diisopropylbenzene monohydroperoxide; peroxyketals such as 2,2-di-(tert.-amylperoxy)-propane and ethyl-3,3-di-(tert.-amylperoxy)-butyrate; butanone peroxide; aliphatic azo compositions such as azo-bis-isobutyronitrile, azo-bis-cyclohexanonitrile, azo-bis-(2-methylvaleronitrile and 2,2'-azo-bis-isobutyric acid alkyl esters; and thermolabile, highly substituted ethane derivatives, for example, based on benzopinacol or silyl-substituted ethane derivatives. High energy radiation may also be employed.

Suitable monomers for the preparation of the copolymers b) include
  1) monomers containing alcoholic hydroxyl groups,
  2) monomers without active hydrogen atoms and optionally containing anhydride groups and
  3) optionally other functional monomers.

Suitable Group 1 monomers include hydroxyalkyl esters of α,β-unsaturated carboxylic acids, in particular acrylic acid or methacrylic acid having 2 to 12, preferably 2 to 6 carbon atoms in the hydroxyalkyl portion. Examples include 2-hydroxyethylacrylate, 2-hydroxypropylacrylate, 1-hydroxymethylethylacrylate, 2-, 3- and 4-hydroxybutylacrylate, the isomeric hydroxypentylacrylates, isomeric hydroxyhexylacrylates, and the methacrylates corresponding to these acrylates. The hydroxyl groups in the hydroxyalkyl esters may be either primary and secondary hydroxyl groups.

In another embodiment the hydroxyl group-containing monomers exemplified above may be partly or completely replaced by modification products obtained by subjecting the exemplified hydroxyalkyl(meth)acrylates to a modification reaction. Suitable modification reactions of this type include the chemical addition of cyclic esters such as ε-caprolactone with ring opening ester formation or the chemical addition of epoxides such as ethylene oxide, propylene oxide, butylene oxide or 2-ethylhexyl-glycidyl ether to result in ring opening ether formation. Instead of the chemical addition of epoxides to hydroxyalkyl esters, the preparation of the esters by the alkoxylation of acrylic or methacrylic acid may, of course, be carried out with larger quantities of alkylene oxides (more than 1 mol of alkylene oxide per mol of acid) so that esters of the acids containing hydroxyl groups and ether groups are obtained directly and may then be used as Group 1 monomers. The use of such monomers containing ether groups or also additional ester groups is less preferred. Copolymers prepared using unmodified hydroxyalkyl(meth)acrylates could also be modified by the previously described chemical addition reactions after the preparation of the copolymers in another embodiment of the present invention.

In the preparation of copolymers b), the hydroxyl group-containing monomers exemplified above are used in quantities of less than 50% by weight, preferably less than 30% by weight, based on all of the monomers. The proportion by weight of the monomers of Group 1 is more preferably 5 to 20% by weight, based on the total weight of the monomers used. When some or all of the hydroxyl group-containing monomers are modified monomers, these are not included in the calculation as such.

The Group 2 monomers include mono-olefinically unsaturated compounds having a molecular weight of 53 to 400, preferably 80 to 220. Examples include acrylic or methacrylic acid alkyl esters or cycloalkyl esters having 1 to 18, preferably 1 to 6 carbon atoms in the alkyl or cycloalkyl portion such as the methyl, ethyl, n-propyl, n-butyl, isopropyl, isobutyl and t-butyl esters of these acids; the isomeric pentyl, hexyl, octyl, dodecyl, hexadecyl or octadecyl esters of these acids and the 3,5,5-trimethylcyclohexyl, isobornyl or cyclohexyl esters of these acids. Also suitable as Group 2 monomers are acrylonitrile, vinyl ethers, methacrylonitrile, vinyl acetate, vinyl chloride, styrene, vinyl toluene or anhydride functional, unsaturated monomers such as itaconic acid anhydride or maleic acid anhydride. Mixtures of any of these monomers may also be used.

The optional Group 3 monomers may be used in quantities of up to 5.0% by weight, preferably 0.1 to 3.0% by weight, based on the total weight of all the monomers. Examples include unsaturated monomers containing carboxyl groups, such as acrylic acid, methacrylic acid, itaconic acid, crotonic acid and semi-esters of maleic and fumaric acid; epoxide functional unsaturated monomers such as glycidyl methacrylate, glycidyl acrylate; and reaction products of (i) acids such as acrylic acid, methacrylic acid, maleic acid, fumaric acid, itaconic acid or crotonic acid with (ii) polyepoxides such as bisphenol-A-diglycidyl ether. Mixtures of any of these monomers may also be used.

The solvents used as polymerization medium include toluene, xylene, chlorobenzene, butyl acetate, ethyl acetate, ethyl glycol acetate, pentyl acetate, hexyl acetate, methoxypropyl acetate, tetrahydrofuran, dioxane, acetone, methyl ethyl ketone, higher substituted aromatic compositions such as solvent naphtha, heavy petrol, and the various Solvesso, Shellsol and Diasol solvents. Also suitable are the relatively high boiling aliphatic and cycloaliphatic hydrocarbons such as white spirits, mineral oil of turpentine, Isopar solvents, Nappar solvents, tetralin and decalin. Mixtures of these solvents may also be used.

Minor quantities of reactive diluents and low viscosity polyols which react with the cross-linker molecules may also be included as solvents.

The acrylate resin may also be prepared in more than two stages, in which case copolymers having a polymodal molecular weight distribution are obtained. Several monomer mixtures are then polymerized in one reaction vessel at differing temperatures and/or differing concentrations of initiator. Auxiliary agents for regulating the molecular weight may also be used as in the two-stage process.

The copolymers may be modified by known processes after polymerization, e.g., by a reaction with glycide or glycidic esters, carboxylic acid anhydrides such as phthalic acid anhydride or by esterification or trans-esterification with carboxylic acids or carboxylic acid esters such as benzoic acid, ethyl hexanoic acid, fatty acids or oleic acid. This modification may be used to improve certain properties such as pigment compatibility, adherence and resistance to alkalies.

The process according to the invention is, however, preferably carried out with the unmodified polyhydroxy polyacrylate resins since they may be combined with the above-mentioned lacquer polyisocyanates to form compositions having excellent pigment wetting properties as can be seen inter alia from the fact that the hardened lacquer films produced according to the invention have a uniform, high gloss surface.

As previously mentioned, component b) of the binder mixtures according to the invention may be based on mixtures of separately prepared polyhydroxy polyacrylates, but this is less preferred.

The mixtures of coating compositions according to the invention may also contain c) reactive diluents in a quantity of up to 5% by weight, based on the weight of component b), in addition to the essential components a) and b). The reactive diluents include in particular the polyhydric alcohols having a molecular weight of 62 to 200 such as ethylene glycol, propylene glycol, 1,4-butanediol, 2-ethyl-1,3-hexanediol, 1,6-hexanediol and mixtures of these polyhydric alcohols. These reactive diluents may be incorporated with component b) after its preparation or prior to or during its preparation, as part of the solvent.

The binder mixtures may also contain other auxiliary agents and additives, in particular solvents of the type used for the preparation of component b).

The quantitative ratios of the reactive components, i.e., isocyanate component a) to component b) and optionally c), are chosen to provide an NCO/OH equivalent ratio of 0.2:1 to 5:1, preferably 0.7:1 to 1.3:1.

For producing the ready for use coating compositions from the binder mixtures according to the invention, the binder may be mixed with the auxiliary agents and additives conventionally used in polyurethane lacquer technology. These include levelling agents based on cellulose esters; oligoalkyl acrylates; pigments and fillers; viscosity controlling additives such as bentonites and silicic acid esters; matting agents such as silica, aluminium silicates and high molecular weight waxes; and catalysts for the isocyanate addition reaction such as tin(II)octoate and dimethyl benzylamine.

The coating compositions produced using the binder mixtures according to the invention may be applied to any substrates, e.g., metal, wood, brickwork, concrete, glass, ceramic, plastics, textiles or paper, by any method of lacquer technology such as spraying, spread-coating, immersion, casting or roller application. A particularly preferred substrate is wood.

The coating compositions to be used according to the invention are distinguished by a long "pot life," very short drying times at temperatures from 10 to 60° C., good levelling flow, fidelity of color and clarity and excellent mechanical properties of the coatings obtained.

The following examples serve to illustrate the invention in more detail without limiting the invention. A comparison of the examples according to the invention with the comparison examples demonstrates the advantages of the new binders. All data given in "part" and "%" are based on weight.

EXAMPLES

Example 1
Preparation of Acrylate Resin I

Part I was introduced into a 10 liter refined steel pressure reactor equipped with stirrer and cooling and heating device and was heated to 95° C. Part II and ¼ of Part IV were then introduced in parallel over a period of 1.0 h. At the end of this time, the temperature was raised to 125° C. within 30 minutes. This was followed by simultaneous addition of Part III (within 1.5 hours) and the remainder of Part IV (within 2 hours). The after-stirring time was 1.5 hours at 120° C.

| Part I | 2227 parts of xylene |
| --- | --- |
| | 1639 parts of butyl acetate |
| Part II | 1640 parts of methyl methacrylate |
| | 122 parts of hydroxyethyl methacrylate |
| | 307 parts of n-butylmethacrylate |
| | 25 parts of acrylic acid |

| Part III | 1516 parts of methyl methacrylate |
| --- | --- |
| | 432 parts of hydroxyethyl methacrylate |
| | 277 parts of butyl methacrylate |
| | 21 parts of acrylic acid |
| Part IV | 293 parts of tert.-butylperoxy-2-ethyl-hexanoate, 70% in butyl acetate |
| | 501 parts of butyl acetate |

The acrylate resin had a solids content of 50%, a viscosity of 2600 mPa.s/23° C., an acid number of 4.5 and an OH number of 28, corresponding to an OH content of 0.85%. GPC investigation showed a maximum of 12,000 and a shoulder at 25,000, based on polystyrene standard. The average molecular weight ($M_n$) of the polyacrylate was 3,400.

Example 2
Preparation of Acrylate Resin II

The composition was different but the method of preparation was the same as in Example 1.

| Part I | 2227 parts of xylene |
| --- | --- |
| | 1639 parts of butyl acetate |
| Part II | 1645 parts of methyl methacrylate |
| | 89 parts of hydroxyethyl methacrylate |
| | 337 parts of n-butyl methacrylate |
| | 25 parts of acrylic acid |
| Part III | 1564 parts of methyl methacrylate |
| | 364 parts of hydroxyethyl methacrylate |
| | 295 parts of butyl methacrylate |
| | 21 parts of acrylic acid |
| Part IV | 293 parts of tert.-butylperoxy-2-ethyl-hexanoate, 70% in butyl acetate |
| | 501 parts of butyl acetate |

The polyacrylate had a solids content of 50%, a viscosity of 2100 mPa.s/23° C., an acid number of 4.4 and an OH number of 21, corresponding to an OH content of 0.64%. GPC investigation showed a maximum at 12,000 and another sub-maximum at 27,000, based on polystyrene standard. The average molecular weight ($M_n$) of the polyacrylate was 3,600.

Example 3 (Comparison)
Preparation of Comparison Acrylate Resin III by a Single Stage Process Part I was introduced into a 10 liter refined steel reactor as in Example 1 and heated to 125° C. Part II was added within 3.0 hours and Part III was added simultaneously within 3.5 hours. Stirring was then continued for 2 hours at 120° C.

| Part I | 2227 parts of xylene |
| --- | --- |
| | 1639 parts of butyl acetate |
| Part II | 3030 parts of methyl methacrylate |
| | 715 parts of hydroxyethyl methacrylate |
| | 550 parts of butyl methacrylate |
| | 45 parts of acrylic acid |
| Part III | 293 parts of tert.-butylperoxy-2-ethyl-hexanoate, 70% in butyl acetate |
| | 501 parts of butyl acetate |

The polyacrylate had a solids content of 50%, a viscosity of 2700 mPa.s/23° C., an acid number of 4.7 and an OH number of 34, corresponding to an OH content of 1.0%. GPC investigation in this case only showed one maximum at 12,000, based on polystyrene standard. The polyacrylate had an average molecular weight ($M_n$) of 3300.

Examples 4 and 5 (according to the invention) and
Example 6 (Comparison)
Preparation of Clear Lacquer Films To prepare clear lacquer films, a polyisocyanate solution was added to the acrylate resins prepared in Examples 1, 2 and 3 (Comparison Example) in an amount sufficient to provide an NCO/OH equivalent ratio of 1:1 and the resins were adjusted to a viscosity of 20 sec. in a DIN 4 cup by means of the solvent mixture used for preparation of the copolymers. The polyisocyanate solution used was a 75% solution in methoxypropyl acetate (MPA)/xylene (1:1) of a biuret group-containing polyisocyanate based on 1,6-diisocyanatohexane and having an NCO content of 16.5%.

Wet films of these solutions 210 μm in thickness were drawn over cleaned metal sheets.

Table 1 sets forth the physical properties of the coatings produced in Examples 4 and 5 according to the invention and the coating produced in Comparison Example 6.

TABLE 1

|  | Example 4 | Example 5 | Example 6 |
|---|---|---|---|
| Dry to the touch | 4 h | 3 h | 7 h |
| Outflow time in s from a DIN cup 4 after 24 h | from 20 to 36 | from 20 to 33 | from 20 to 52 |
| Pendulum hardness in s after 14 days | 154 | 153 | 147 |
| Solvent attack by toluene/ButAcet/MPA/acetone after 7 days | 2222 | 2222 | 2222 |

These results demonstrate the improvements of the coating compositions according to the invention. Even though identical starting conditions (same solvents, same monomers, same initiator, same total concentration of initiator), the bimodal molecular weight distribution of the polyacrylate component according to the invention provides the same solvent resistance, a doubling of the drying speed, an improvement in the time available for processing and an increase in the hardness of the coating in spite of the marked reduction in the hydroxyl group content and, thus, reduction in the cross-linking density.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder mixture for two-component polyurethane coating compositions which dries at room temperature, wherein the binder comprises
   a) a polyisocyanate component,
   b) a hydroxy-functional polyacrylate component based on a mixture of at least two hydroxyl group-containing poly(meth)acrylate resins
      i) having a molecular weight ($M_n$) of 1000 to 100,000,
      ii) having an at least bimodal molecular weight distribution,
      iii) prepared by radical copolymerization of olefinically unsaturated monomers in a solvent using monomer mixtures containing less than 50% by weight of monomers having hydroxyl groups and
      iv) wherein the hydroxyl group content of the resin having the lowest molecular weight is at least 1.5 times the hydroxyl group content of the component having the highest molecular weight,
   c) optionally reactive diluents,
wherein components a) and b) are present in an amount which corresponds to an NCO/OH equivalent ratio of 0.2:1 to 5:1.

2. The binder mixture of claim 1, characterized in that component b) comprises poly(meth)acrylate resins
   i) prepared by radical copolymerization of olefinically unsaturated monmers in a solvent using monomer mixtures containing less than 30% by weight of monomers having hydroxyl groups,
   ii) wherein the maximum of the molecular weight ($M_n$) of that resin which has the highest molecular weight, determined by gel permeation chromatography, is at least 1.3 times the maximum of the molecular weight ($M_n$) of the resin which has the lowest molecular weight, determined by gel permeation chromatography,
   iii) wherein the resin with the highest molecular weight having a hydroxyl group content of 0.3 to 2% by weight and the resin with the lowest molecular weight has a hydroxyl group content of 1 to 5% by weight and
   iv) wherein the hydroxyl group content of the resin having the lowest molecular weight is at least twice the hydroxyl group content of the resin having the highest molecular weight.

3. The binder mixture of claim 1 wherein component b) comprises a binary mixture of poly(meth)acrylate resins wherein the resin with the lower molecular weight is present in an amount of 30 to 70% by weight, based on the weight of component b).

4. The binder mixture of claim 2 wherein component b) comprises a binary mixture of poly(meth)acrylate resins wherein the resin with the lower molecular weight is present in an amount of 30 to 70% by weight, based on the weight of component b).

5. The binder mixture of claim 1 wherein the poly(meth)acrylate resins of component b) are prepared by an at least two-stage polymerization reaction of at least two different monomer mixtures carried out successively in the same reaction vessel in an organic medium as solvent.

6. The binder mixture of claim 2 wherein the poly(meth)acrylate resins of component b) are prepared by an at least two-stage polymerization reaction of at least two different monomer mixtures carried out successively in the same reaction vessel in an organic medium as solvent.

7. The binder mixture of claim 3 wherein the poly(meth)acrylate resins of component b) are prepared by an at least two-stage polymerization reaction of at least two different monomer mixtures carried out successively in the same reaction vessel in an organic medium as solvent.

8. The binder mixture of claim 4 wherein the poly(meth)acrylate resins of component b) are prepared by an at least two-stage polymerization reaction of at least two different monomer mixtures carried out successively in the same reaction vessel in an organic medium as solvent.

9. The binder mixture of claim 1 wherein polyisocyanate component a) comprises at least one polyisocyanate containing uretdione, biuret, urethane and/or isocyanurate groups and prepared from a diisocyanate having (cyclo) aliphatically bound isocyanate groups and a molecular weight of 168 to 300.

10. The binder mixture of claim 2 wherein polyisocyanate component a) comprises at least one polyisocyanate containing uretdione, biuret, urethane and/or isocyanurate groups and prepared from a diisocyanate having (cyclo) aliphatically bound isocyanate groups and a molecular weight of 168 to 300.

11. The binder mixture of claim 3 wherein polyisocyanate component a) comprises at least one polyisocyanate containing uretdione, biuret, urethane and/or isocyanurate groups and prepared from a diisocyanate having (cyclo) aliphatically bound isocyanate groups and a molecular weight of 168 to 300.

12. The binder mixture of claim 4 wherein polyisocyanate component a) comprises at least one polyisocyanate containing uretdione, biuret, urethane and/or isocyanurate groups and prepared from a diisocyanate having (cyclo) aliphatically bound isocyanate groups and a molecular weight of 168 to 300.

* * * * *